United States Patent
Balczun

(10) Patent No.: US 6,220,580 B1
(45) Date of Patent: Apr. 24, 2001

(54) LEAF SPRING PIVOT BEARING AND ASSEMBLY WITH ADJUSTMENT PILOT

(75) Inventor: Paul J. Balczun, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/173,045

(22) Filed: Oct. 15, 1998

(51) Int. Cl.$^7$ .................................................. B60G 9/18
(52) U.S. Cl. .......................... 267/7; 267/6; 280/124.175
(58) Field of Search ............................... 267/3, 6, 7, 30, 267/140.4, 141.1, 141.2, 141.3, 141.4, 141.5, 294; 280/680, 686, 124.17, 124.175, FOR 175

(56) References Cited

U.S. PATENT DOCUMENTS

| | | | |
|---|---|---|---|
| 1,892,668 | 1/1933 | Heiney | 267/262 |
| 2,434,304 | 1/1948 | Wilson | 267/54 |
| 2,831,674 | 4/1958 | Brown et al. | 267/54 |
| 2,929,618 | 3/1960 | Hutchens | 267/30 |
| 3,099,459 | 7/1963 | Zalar et al. | 280/104.5 |
| 3,698,702 | 10/1972 | Beck | 267/47 |
| 4,322,061 | 3/1982 | Masser | 267/54 R |
| 5,016,906 | 5/1991 | Cadden | 280/680 |
| 5,020,824 | 6/1991 | Mounier-Poulat et al. | 280/686 |
| 5,114,125 | 5/1992 | Srch et al. | 267/265 |
| 5,676,356 | 10/1997 | Ekonen et al. | 267/294 |

FOREIGN PATENT DOCUMENTS

3332952 * 3/1985 (DE) ..................................... 267/263

* cited by examiner

Primary Examiner—Robert J. Oberleitner
Assistant Examiner—Pan Rodriguez
(74) Attorney, Agent, or Firm—Michael M. Gnibus; Randall S. Wayland

(57) ABSTRACT

A leaf spring suspension assembly includes a leaf spring assembly having a plurality of vertically stacked leaf springs and a bearing assembly positioned adjacent an end thereof. The bearing assembly includes an upper insulator cup having an upper recess and a lower bracket cap having a lower recess and upper and lower bonded bearings. The upper bonded bearing is received in the upper recess and includes a rigid lower member having an upper elastomer element bonded thereto; the bearing being received adjacent the upper side of the leaf spring assembly. The lower bonded bearing is received in the lower recess and includes a rigid upper member having a lower elastomer element bonded thereto; the lower bearing being received adjacent the lower side of the leaf spring assembly. At least one of the upper and lower elastomer elements includes a spherical elastomer element. An adjuster may be provided for selectively adjusting and securing the relative position between the leaf spring assembly and the bearing assembly.

26 Claims, 5 Drawing Sheets

LEAF SPRING PIVOT BEARING AND ASSEMBLY WITH ADJUSTMENT PILOT

FIELD OF THE INVENTION

The present invention relates generally to bearings, and, more particularly, to bearings for leaf spring suspension systems.

BACKGROUND OF THE INVENTION

Heavy duty trucks such as large, tandem axle trucks commonly employ leaf spring suspension assemblies. A leaf spring suspension may include a plurality of stacked leaf springs. The springs are secured at their centers to the truck frame by means of a center post at a location between the axles. The springs extend from their centers to the respective axles in cantilever fashion. Typically, a pair of leaf spring suspension assemblies are used for each pair of axles with one leaf spring suspension assembly being positioned on either side of the truck. The ends of the springs may be connected to the axles by bearings. The bearing may include an elastomeric member configured and positioned to allow relative movement between the spring and the associated axle to prevent damage to the spring or undue limitation of the axle travel. Examples of such elastomer bearings may be found in U.S. Pat. Nos. 5,676,356, 5,020,824, 4,322,061, 3,099,459, 2,929,618, and 2,831,674.

In a leaf spring suspension assembly as described above, the wheels, axles and springs may undergo a wide range and variety of deflections and combinations of deflections in use. For example, when the truck is traveling over rough terrain or curbs, the wheels and, thus, the adjacent axles, may move independently and through large degrees of displacement. If a wheel on one end of an axle is displaced upwardly while the wheel on the opposite end of the axle is displaced downwardly, the axle will pivot and thereby induce a conical torsional load which tends to twist the leaf springs. Moreover, if one wheel is displaced upwardly and the adjacent wheel (on the adjacent axle) is displaced downwardly, the respective axles will pivot in opposite directions and thereby induce a torsional load which tends to conically deflect the respective ends of the leaf springs in opposite directions. As a wheel travels vertically upwardly or downwardly and flexes the leaf spring assembly beyond its neutral position, the vertical angle between the leaf spring end and the axle is changed, thereby inducing a localized load on the end of the spring which may tend to bend the leaf springs. One end of the wheel may also be displaced laterally so that the wheel is rotated about a vertical axis, again inducing a torsional load on the spring.

It is important that such deflections and combinations of deflections not result in damage to the leaf spring assembly. It is also important that the leaf spring suspension and the components thereof be durable and not negatively affect the handling of the vehicle.

One problem encountered with multiple or tandem axle vehicles is that a misalignment of the axles may cause significant wear damage to the tires and other components. Moreover, misalignment may degrade the handling of the vehicle. Typically, the relative alignment of the axles is established at the factory during manufacture of the truck. It is not uncommon for the axles to become misaligned thereafter as a result of impacts in use or improper replacement or repair of components of the suspension and drive train.

Thus, there exists a need for a means for accommodating the various pivotal loads applied between an axle and a leaf spring assembly. Such means should not negatively affect the operability or handling of the vehicle. Such means should be durable. Moreover, there is a need for means for conveniently and effectively adjusting alignment between axles of a tandem axle vehicle, particularly of the type employing a leaf spring suspension.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

The present invention is a leaf spring suspension assembly and bearings therefor which accommodates various pivotal loads applied between an axle and a leaf spring assembly. The leaf spring suspension assembly does not negatively affect the operability and handling of a vehicle, is durable, and provides improved service life. In another aspect, the present invention provides means for conveniently and effectively adjusting alignment between axles of a tandem axle vehicle. According to another aspect of the present invention, a bearing is provided for a leaf spring suspension assembly which allows convenient replacement of the working parts thereof.

In more detail, the present invention is directed to a bonded bearing, a bearing assembly, and a leaf spring suspension assembly each including a bonded elastomer member. The bonded bearing, the bearing assembly and the leaf spring suspension assembly may be used for tandem axle vehicles or the like, for example. The bonded bearing, the bearing assembly, and the leaf spring suspension assembly each provide improved isolation of a leaf spring assembly from pivotal/torsional loads caused by movements of an associated axle, for example. Furthermore, the bonded bearing, the bearing assembly, and the leaf spring suspension assembly each provide improved durability, service life and convenience of installation and maintenance.

The leaf spring suspension assembly includes a leaf spring assembly including a plurality of vertically stacked leaf springs. A bearing assembly is positioned adjacent the leaf spring assembly. The bearing assembly includes an upper insulator cup, a lower bracket cap and upper and lower bonded bearings. The upper insulator cup includes an upper recess and the upper bonded bearing is received in the upper recess. The upper bonded bearing includes a rigid lower member received adjacent an upper side of the leaf spring assembly. An upper elastomer element is bonded to the rigid lower member. The lower bonded bearing is received in the lower recess. The lower bonded bearing includes a rigid upper member received adjacent a lower side of the leaf spring assembly. A lower elastomer element is bonded to the rigid upper member. At least one, and preferably both, of said upper and lower elastomer elements comprises a spherical elastomer element.

Preferably, at least one of the upper and lower elastomer elements includes at least two elastomer layers and a shim interposed between the elastomer layers. Means may be provided for compressing the upper elastomer element between the upper insulator cup and the rigid lower member and for compressing the lower elastomer element between the lower bracket cap and the rigid upper member.

According to another aspect, the elastomer bearing assembly according to the present invention may be used with a leaf spring assembly and includes an upper insulator cup having an upper planar recess and a lower bracket cap having a lower spherical recess. An upper bonded bearing is received in the upper planar recess. The upper bearing includes a rigid lower member having a first pilot and a spherical surface and an upper elastomer element bonded to the spherical surface. The upper elastomer element includes a plurality of spherical elastomer layers. The first pilot is adapted to be received adjacent to the leaf spring assembly. A lower bonded bearing is received in the lower recess. The lower bonded bearing includes a rigid upper member having a second pilot and a spherical surface and a lower elastomer element is bonded to the spherical surface. The lower elastomer element also includes a plurality of spherical layers. The second pilot is adapted to be received adjacent to the leaf spring assembly.

The present invention is further directed to an elastomer bearing assembly for use with an associated leaf spring assembly. The bearing assembly includes an insulator cup having a first recess and a bracket cap having a second recess. A first bonded bearing is received in the first recess, the first bonded bearing including a first rigid inner member. A first elastomer element is bonded to the first rigid inner member. A second bonded bearing is received in the second recess, the second bonded bearing including a second rigid inner member. A second elastomer element is bonded to the second rigid inner member. The first and second rigid inner members are adapted to receive the leaf spring therebetween. At least one, and preferably both, of said upper and lower elastomer elements comprises a spherical elastomer element.

According to another aspect of the invention, preferably the bearing assembly allows for adjustment of the relative positions of the bearing assembly and the associated leaf spring assembly. This adjustability may be used to selectively align tandem axles, for example. Adjustment means is provided for selectively adjusting and securing the relative positions of the leaf spring assembly and the bearing assembly. The adjustment means include a pilot adapted to be received in a registering hole of the leaf spring assembly, means for repositioning the pilot relative to the bearing assembly, and means for securing the pilot in a selected position relative to the bearing assembly.

The bonded bearing according to the present invention may be used in a leaf spring suspension assembly as described above. The bonded bearing includes a rigid inner member having an outer surface and an elastomer element bonded to the outer surface of the rigid inner member. Adjustment means are provided for selectively adjusting and securing the relative positions of the leaf spring and the bonded bearing. The adjustment means includes a pilot adjoining the rigid inner member and adapted to be received in a hole of the leaf spring, means for repositioning the pilot relative to the rigid inner member, and means for securing the pilot in a selected position relative to the rigid inner member.

DETAILED DESCRIPTION OF PREFERRED EMBODIMENTS

Figure 1:
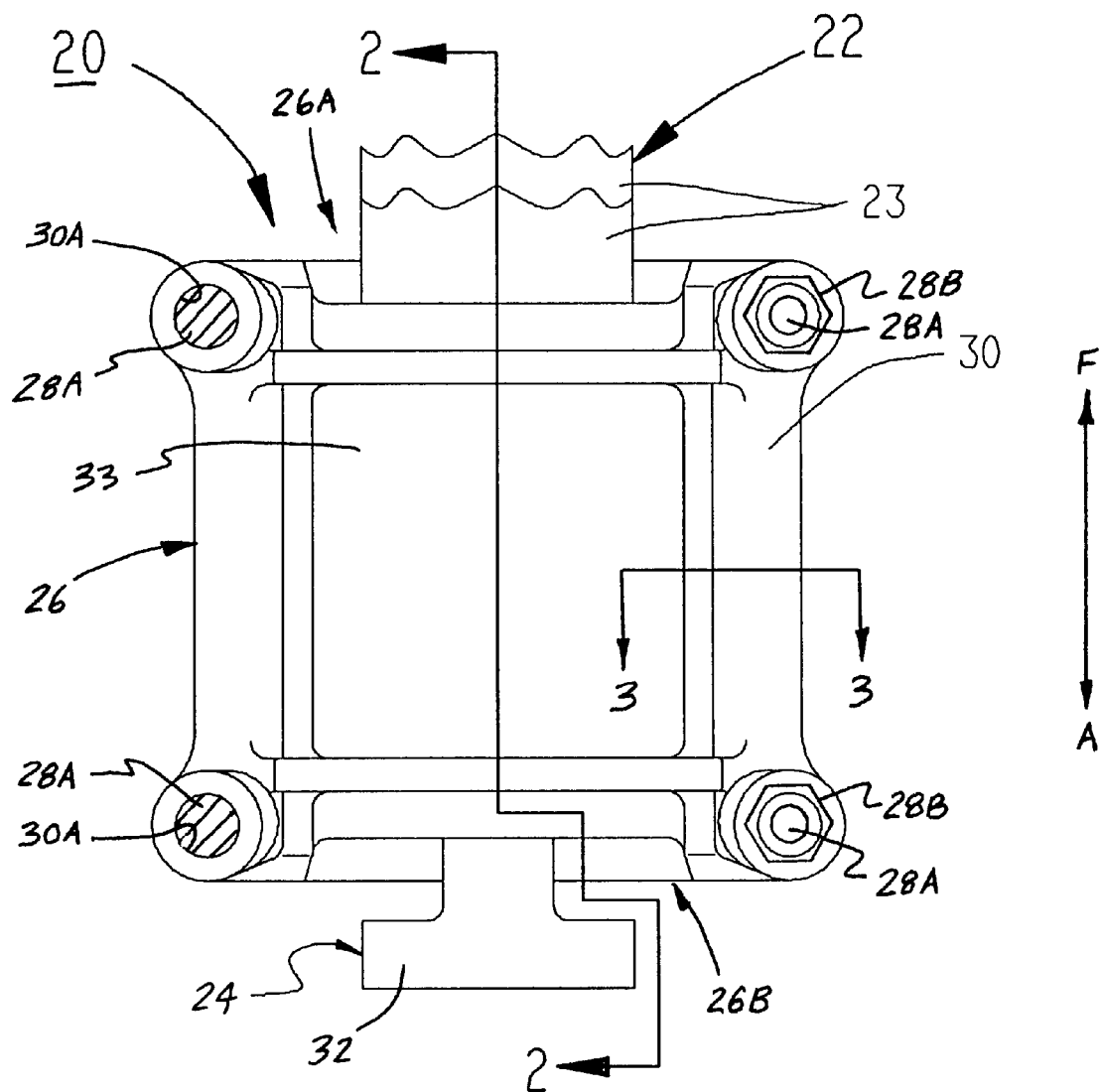
FIG. 1 is a top plan view of a portion of a leaf spring suspension assembly according to the present invention.

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art With reference to FIGS. 1 and 2, a leaf spring suspension assembly 20 according to the present invention is shown therein. The suspension assembly 20 includes a leaf spring assembly 22 and a bearing assembly 26 and supports a truck axle 80 (see FIG. 2). The suspension assembly 20 includes an end 24. The leaf spring assembly 22 includes a plurality of vertically stacked leaf springs 23 extending lengthwise along the fore and aft direction F-A (see FIG. 1) of a truck (not shown), for example. The leaf spring assembly 22 may be cantilevered from a portion thereof (not shown) which is fixedly mounted to the truck frame (not shown), preferably by means of a center post (not shown). The fixedly mounted portion may be an opposing end of the leaf spring assembly 22, but, preferably, is an intermediate portion such that a second portion (not shown) of the leaf spring assembly 22 extends in cantilever fashion from the fixed mounting point in a direction opposite the end 24, presenting a generally "camel back" (single hump) side profile (not shown). Such a "camel back" system is described in U.S. Pat. No. 2,831, 674 to Brown et al entitled "Spring Suspension." Preferably, the opposite end of the assembly includes a bearing assembly corresponding to the bearing assembly 26 by which it is connected to a forward axle of the truck. Preferably, the suspension system associated with the opposing ends of the axles, i.e., on the other side of the truck, is a mirror image of the leaf spring suspension assembly 20 described herein.

Figure 2:
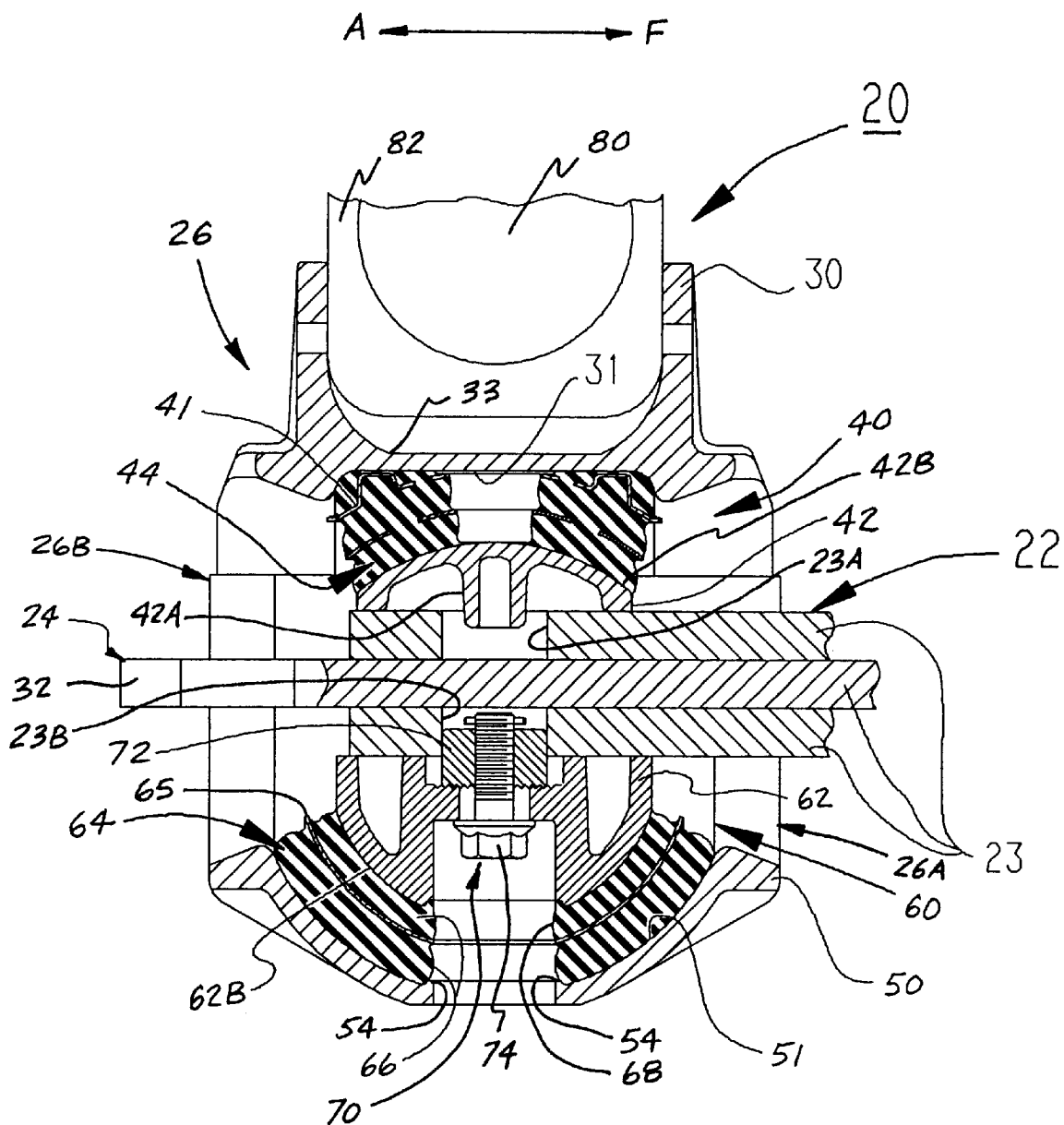
FIG. 2 is a cross-sectional view of the leaf spring suspension assembly of FIG. 1 taken along the line 2—2 of FIG. 1 and mounted on an axle support, the axle support and an axle being shown in fragmentary, schematic view.
Figure 3:
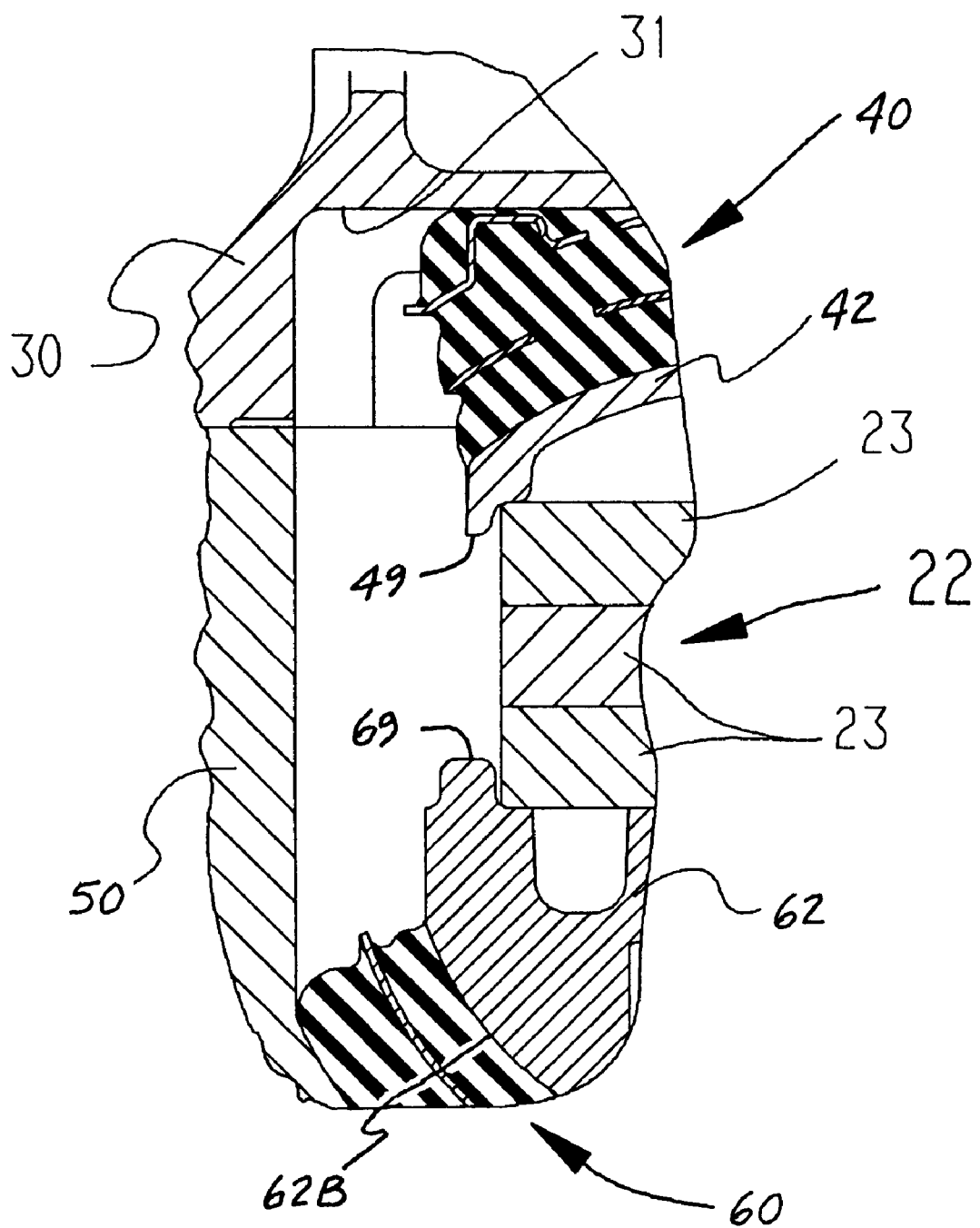
FIG. 3 is a partial, fragmentary, cross-sectional view of the leaf spring suspension assembly of FIG. 1 taken along the line 3—3 of FIG. 1.
Figure 4:
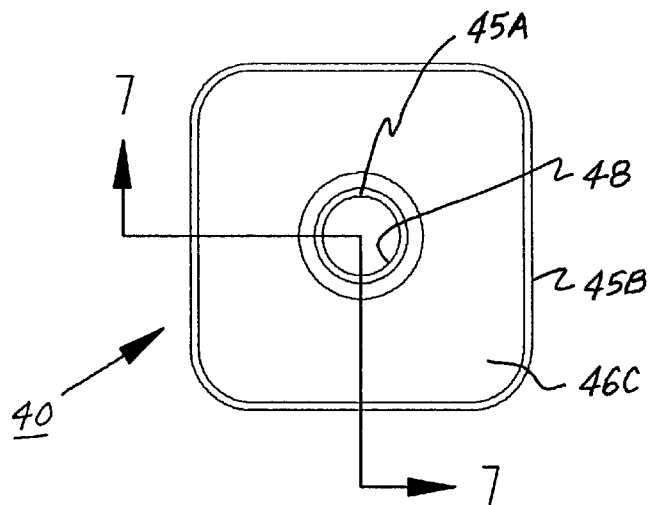
FIG. 4 is a top plan view of an upper bonded bearing of the leaf spring suspension assembly of FIG. 1.
Figure 5:
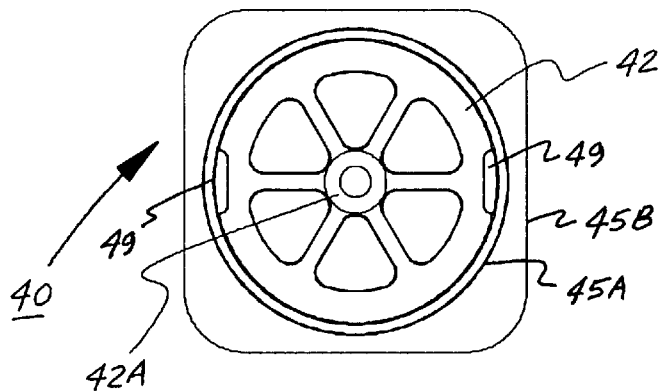
FIG. 5 is a bottom plan view of the upper bonded bearing of FIG. 4.
Figures 6, 7:
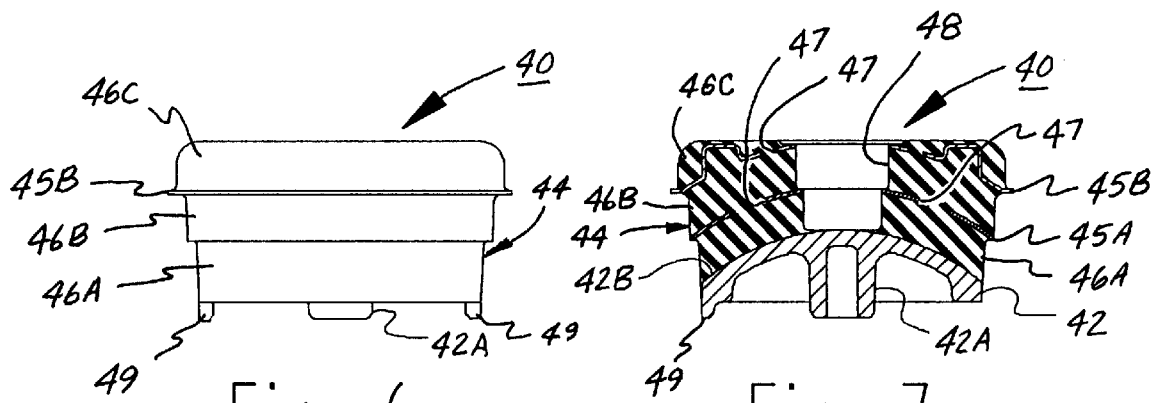
FIG. 6 is a side elevational view of the upper bonded bearing of FIG. 4.
FIG. 7 is a cross-sectional view of the upper bonded bearing of FIG. 4 taken along the line 7—7 of FIG. 4.
Figure 8:
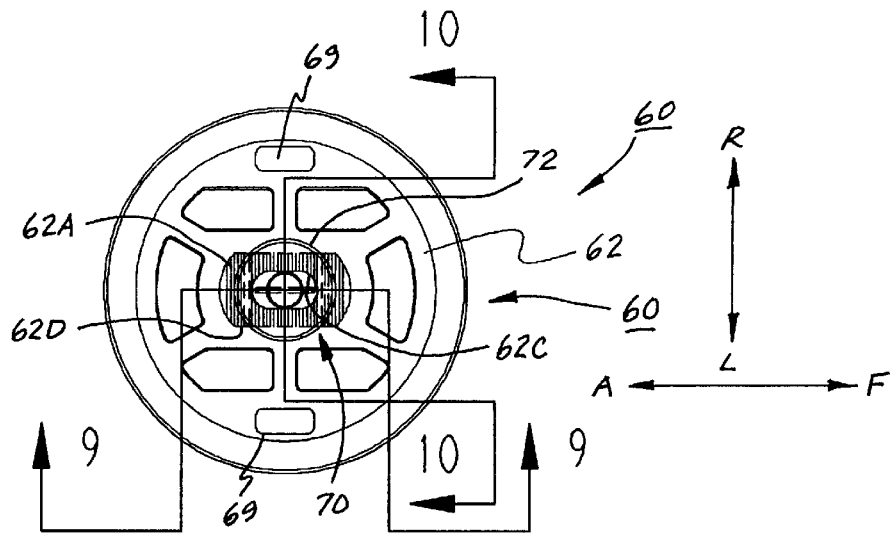
FIG. 8 is a top plan view of the lower bonded bearing, and an adjustment mechanism of the leaf spring suspension assembly of FIG. 1.
Figure 9:
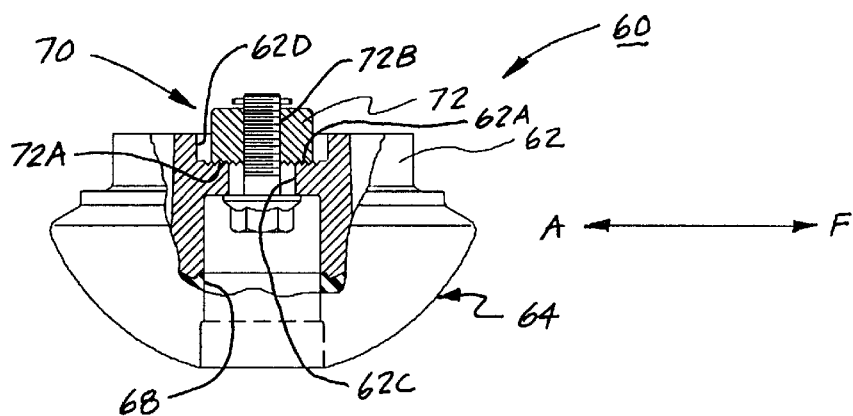
FIG. 9 is a partially sectioned, side view of the lower bracket cap, lower bonded bearing, and adjustment mechanism of FIG. 8 taken along the line 9—9 of FIG. 8.
Figure 10:
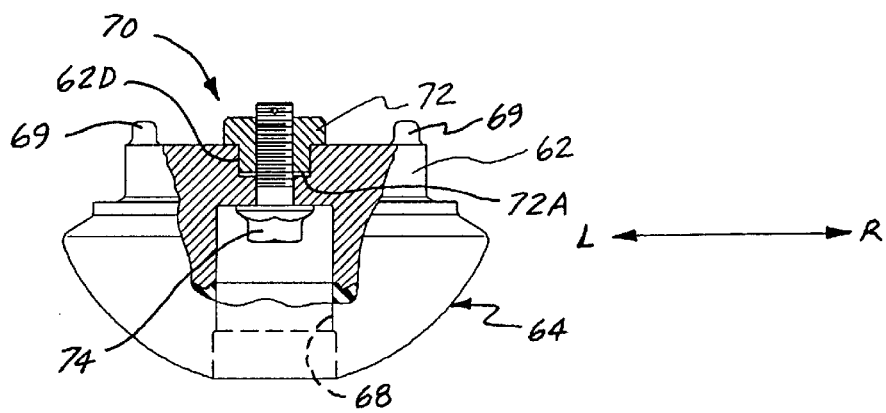
FIG. 10 is a partial sectioned, end view of the lower bonded bearing, and adjustment mechanism of FIG. 8 taken along the line 10—10 of FIG. 8.

Preferably, the bearing assembly 26 is symmetric about a fore-and-aft axis and is also symmetric about a side-to-side axis. As best seen in FIG. 2, the bearing assembly 26 includes an upper insulator cup 30 and a lower bracket cap 50. The insulator cup 30 is welded to an axle bracket 82 which is received in a cavity 33 formed in the upper surface of the cup 30. Generally, this is done on the original equipment. Retrofit of the present invention involves replacement of the prior art lower cap and prior art elastomer elements. The insulator cup 30 and the bracket cap 50 are secured together by four bolts 28A (two shown as sectioned with the nuts 28B removed for clarity) which are received in the four bores 30A (only two shown). The cup 30 and the bracket cap 50 together define an entrance opening 26A and an exit opening 26B through which the leaf spring assembly 22 extends and the end thereof projects outwardly beyond the exit opening 26B. The center leaf spring 23 has a safety head 32 which may serve to retain the leaf spring assembly 22 in the bearing assembly 26 in the event the axle 80 becomes otherwise detached from the truck.

An upper bonded bearing 40 is positioned between the insulator cup 30 and the upper leaf spring 23 and is received in a planar upper recess 31 formed in the underside the insulator cup 30. A pilot 42A is integrally formed with and projects downwardly from the upper bonded bearing 40 and is received in a hole 23A of the leaf spring assembly 23. A lower bonded bearing 60 is positioned between the bracket cap 50 and the lower leaf spring 22 and is received in a spherical lower recess 51 of the bracket cap 50. A pilot member 72 is connected to the lower bonded bearing and is received in a hole 23B formed in the lowermost leaf spring 23. Preferably, the upper bonded bearing 40 and the lower bonded bearing 60 are not bonded to the upper insulator cup 30, the lower bracket cap 50, or the leaf spring assembly 22 such that they can be readily removed or replaced.

The bolts 28A are torqued to provide a compressive load to the upper bonded bearing 40 and the lower bonded bearing 60. As discussed in more detail below, the bonded bearings 40 and 60 include upper and lower elastomer elements 44 and 64, respectively, and serve to absorb and isolate the leaf spring assembly 22 from various torsional/pivotal forces which may occur as the axle 80 is deflected relative to the attachment point of the leaf spring assembly 22.

With reference to FIGS. 2–7, the upper bonded bearing 40 includes a rigid lower member 42. The rigid lower member 42 is integrally formed with the pilot 42A and also includes a spherical upper surface and opposed side tabs 49 along opposing sides thereof and extending perpendicularly to the F-A direction (see FIGS. 3 and 7). The tabs 49 serve to prevent rotation of the uppermost leaf spring 22 relative to the lower rigid member 42 about a vertical axis.

The upper elastomer element 44 is bonded to the spherical surface 42B. The upper elastomer element 44 includes elastomer layers 46A, 46B, 46C which are bonded to and interleaved with shims 45A, 45B. The shims have holes 47 through which the elastomer layers are joined. The elastomer layers and the shims define a core hole 48. The spherical surface 42B, the lowermost elastomer layers 46A, 46B and the shim 46A are spherically shaped. The uppermost elastomer layer 46C and the uppermost shim 45B have rectangular shapes complementary to the shape of the planar upper recess 31.

Preferably, the lower rigid member 42 is formed of ductile cast iron. The shims are preferably formed of stamped steel. The elastomer layers are preferably formed of a natural rubber or other suitable elastomer material. The upper bonded bearing 40 is preferably formed by a transfer molding process; however, any suitable method may be used.

With reference to FIGS. 2, 3 and 8–10, the lower bonded bearing 60 includes an upper rigid member 62. The upper rigid member 62 has an upper engagement surface 62A (see FIGS. 8 and 9), a lower spherical surface 62B, a slot 62C, a slot 62D, and opposed side recesses 69 (shown in FIGS. 3, 8 and 10). The side recesses 69 correspond to the side recesses 49 of the upper bonded bearing 40 and serve the same anti-rotation function with respect to the lowermost leaf spring 23.

The lower elastomer element 64 is bonded to the spherical surface 62B. The lower elastomer element 64 includes an elastomer layers 66 and a shim 65. The elastomer layers 66 and the shim 65 are each preferably spherically shaped and define a core hole 68. The lower bracket cap 50 has a lip 54 which extends inwardly into the hole 68 and braces a portion of the lowermost elastomer layer 66. Preferably, the upper rigid member 62, the elastomer layers 66, the shim 65 and the lower bonded bearing 60 are formed of the same materials and by the same methods as described above for the lower rigid member 42, the elastomer layers 46A, 46B, 46C, the shims 45A, 45B and the upper bonded bearing 40, respectively.

The leaf spring suspension assembly 20 may be assembled and installed in the following manner. The upper insulator cup 30 is pre-welded or otherwise secured to the axle bracket 82. The upper bonded bearing 40 is inserted into the upper recess 31 of the insulator cup 30. The leaf spring assembly 22 is then mounted below the upper bonded bearing 40 such that the pilot 42A is received in the hole 23A. The lower bonded bearing 60 is then placed under the leaf spring assembly 22 such that the pilot 72 is received in the hole 23B. The lower bracket cap 50 is placed over the lower bonded bearing 60. The bolts 28A are inserted into the bores 30A which traverse the insulator cup 30 and lower bracket cap 50. The bolts 28A and nuts 28B are then tightened to compress the elastomer layers 46A, 46B and 66 to a desired load.

Preferably, the elastomer layers are precompressed by from about 10% to 20% of their unstressed thicknesses, and more preferably 15%. Notably, the bearing assembly defines voids about and preferably surrounding the peripheries of the elastomer elements 44, 64 (i.e., on the lateral and fore and aft sides thereof). These voids and the core holes 48, 68 allow substantial areas of the elastomer layers 46A, 46B and 66 to bulge inwardly and outwardly responsive to compression of the elastomer layers. This bulging in turn allows for a relatively large degree of precompression while also obtaining suitably soft spring stiffnesses for the elastomer layers when operating in shear. Preferably, the elastomer layers 46A, 46B and 66 have an average shape factor (i.e., a ratio of effective load area to effective bulge area) of between about 1.0 and 4.0, and more preferably about 1.7 for the upper bonded bearing 40 and about 2.8 for the lower bonded bearing 60. By way of example, and not to be considered limiting, the vertical spring rate of each bearing assembly 26 is about 129,000 lbs./in. In the lateral direction (along R-L) and fore and aft (along F-A) direction, the spring rate is about 35,100 lbs./in. In the torsional direction, about the vertical axis, the stiffness is about 497 in.-lbs/deg. In the pivotal direction, about the lateral R-L or fore-and aft F-A axis, the stiffness is about 1,022 in.-lbs./deg.

Because of the spherical configuration of the elastomer elements 44, 64 and the overall construction of the bearing assembly 26, the bearing assembly 26 will serve to isolate and accommodate motion of the leaf spring assembly 22 in substantially all pivotal directions. The elastomer elements 44, 64 will shear with the respective upper and lower rigid members 42, 62 because they are bonded to the outer surfaces thereof. The upper and lower elastomer elements 44, 64 will at the same time shear relative to the upper isolator cup 30 and the lower bracket cap 50, respectively, as a result of the configuration of the recesses 31 and 51 (including the lip 54) and also as a result of the precompression-induced frictional engagement between the elastomer and the relatively roughcast metal of the cup 30 and the cap 50.

The elastomer layers 46A, 46B and 66 will act in shear in all directions of pivot between the leaf spring assembly 22 and the axle 80. For example, the elastomer elements 44, 64 will shear about an axis parallel to the length of the leaf spring assembly 22 (e.g., parallel to the F-A direction). Also, the bearing assembly 26 will allow relative rotation between the leaf spring assembly 22 and the axle 80 about an axis parallel to the axle length. Moreover, the bearing assembly 26 will allow relative rotation between the leaf spring assembly 22 and the axle 80 about a vertical axis. The bearing assembly 26 will also allow relative rotation about any combination of the foregoing axes.

A significant benefit provided by the bearing assembly 26 is that the service lives of the elastomer layers may be substantially extended as compared to the prior art. Because the elastomer layers are compressed in use, fatigue of the elastomer layers operating in shear is substantially reduced.

A further significant benefit provided by the bearing assembly 26 is that the spherical elastomer members minimize undesirable displacement of the axle relative to the spring assembly. The spherical shapes of the elastomer layers, the spherical shapes of the shims, the combination of interleaved shims and elastomers, and the pre-compression all serve to minimize linear motion between the axle 80 and the end of the leaf spring assembly 22.

Furthermore, the upper bonded bearing 40 and the lower bonded bearing 60 may be readily, conveniently and separately replaced. The operator need merely disassemble the leaf spring assembly 20 by reversing the assembly steps (except for the step of attaching the isolator cup 30 to the axle bracket 82) and reassemble the assembly using different upper and/or lower bonded bearings 40, 60. Also, the leaf spring suspension system 20 may be conveniently and cost-effectively retrofitted to existing trucks as before described. Moreover, the bearing assembly 26 allows the application of an accurate amount and distribution of pre-compression to improve the performance of the elastomer layers 46A, 46B and 66.

The leaf spring suspension assembly 20 is further provided with an adjustment mechanism 70 which allows an operator to selectively position and secure the bearing assembly 26 and the axle 80 relative to the leaf spring assembly 22. Such adjustment may be desirable to align adjacent axles or to maintain proper vehicle tracking, for example.

With reference to FIGS. 2 and 8–10, the adjustment mechanism includes the pilot 72 and a threaded bolt 74. The pilot 72 is positioned in the slot 62D such that a portion thereof extends up into the hole 23B of the lowermost leaf spring 23. The pilot 72 is preferably just smaller than the hole 23B in all dimensions. The slot 62D has a length greater than the corresponding length of the pilot 72 in the F-A direction. The bolt 74 extends up through the slots 62C and 62D. The slot 62C communicates with the slot 62D and similarly has a length greater than the diameter of the bolt 74 along the F-A direction. The pilot 72 has a threaded bore 72B through which the bolt 74 extends. The upwardly facing engagement face 62A (which is positioned in the slot 62D) has formed therein a series of parallel serrations, i.e., alternating ridges and slots. The serrations extend perpendicularly to the F-A direction. The pilot 72 has complimentary serrations on its lower engagement surface 72A.

To adjust the relative positions of the bearing assembly 26 and the leaf spring assembly 22, the operator may use a wrench or other suitable tool to loosen the bolts 28A and back the bolt 74 out of the pilot 72. This increases the distance between the bolt head and the pilot 72. The pilot 72 may thereafter be lifted by tapping to release the serrations of the engagement surface 72A from the serrations of the engagement surface 62A. The pilot 72 and bolt 74 may then be slid along the slots 62C, 62D along the F-A direction in either direction (by moving the axle). In this way, the relative positions of the pilot 72 and the lower rigid member 62, and thus the leaf spring assembly 22 and the bearing assembly 26, are changed.

Thereafter, the bolt 74 may be tightened to re-secure the pilot 72 to the lower rigid member 62. The resulting re-engagement of the serrations of the engagement surfaces 72A and 62A will prevent unintended movement of the bearing assembly 26 relative to the leaf spring assembly 22 along the F-A direction. Preferably, the pilot 72 is movable through a range of between about plus or minus 0.25 in. along the F-A direction. The relative dimensions of the pilot 42A and the hole 23A are chosen to allow some clearance between the pilot 42A and the side walls of the hole 23A throughout this range of motion. The side tabs 49, 69 prevent the bonded bearings 40, 60 from rotating relative to the spring assembly 22 when the bolt 74 is being loosened and tightened.

The pilot 72 is preferably formed by casting or from bar stock which is milled to form the serrations of the engagement surface 72A. The serrations 62A may be formed in the lower rigid member 62 by milling, casting or any other suitable technique.

The relative positions of the cup 30, the cap 50 and the upper and lower bonded bearings 40, 60 may be reversed if desirable. It is also contemplated that the recess 31 may be spherically shaped with the upper elastomer element being suitably modified to fit therein.

The foregoing is illustrative of the present invention and is not to be construed as limiting thereof. Although an exemplary embodiment of this invention has been described, those skilled in the art will readily appreciate that many modifications are possible in the exemplary embodiment without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A leaf spring suspension assembly, comprising:
   a) a leaf spring assembly including a plurality of vertically stacked leaf springs, said leaf spring assembly having upper and lower opposed sides; and
   b) a bearing assembly positioned adjacent said leaf spring assembly, said bearing assembly including:
      i) an upper insulator cup including an upper recess;
      ii) a lower bracket cap including a lower recess;
      iii) an upper bonded bearing received in said upper recess, said upper bonded bearing including a rigid lower member positioned adjacent said upper side of said leaf spring assembly and an upper elastomer element bonded to said rigid lower member; and
      iv) a lower bonded bearing received in said lower recess, said lower bonded bearing including a rigid upper member positioned adjacent said lower side of said leaf spring assembly and a lower elastomer element bonded to said rigid upper member wherein at least one of said upper and lower elastomer elements comprises a spherical elastomer element so that the bearing assembly serves to isolate and accommodate motion of the leaf spring assembly in substantially all pivotal directions; and v) means for selectively adjusting and securing a relative position of the bearing assembly and the leaf spring assembly, said adjusting and securing means being accessible when the bearing is fully assembled.

2. The leaf spring suspension assembly of claim 1 wherein at least one of said upper and lower elastomer elements comprises at least two elastomer layers and a shim interposed between said elastomer layers.

3. The leaf spring suspension assembly of claim 1 wherein both of said upper and lower elastomer elements comprises a spherical elastomer element.

4. The leaf spring suspension assembly of claim 1 further comprising means for precompressing said upper elastomer element between said upper insulator cup and said rigid lower member and for precompressing said lower elastomer element between said lower bracket cap and said rigid upper member.

5. The leaf spring suspension assembly of claim 1 wherein said bearing assembly includes a void adjacent at least one of said upper and lower elastomer elements to allow said adjacent elastomer element to bulge into said void when compressed.

6. The leaf spring suspension assembly of claim 5 wherein said void substantially surrounds an outer periphery of said adjacent elastomer element.

7. The leaf spring suspension assembly of claim 5 wherein said void includes a core hole formed in said adjacent elastomer element.

8. The leaf spring suspension assembly of claim 1 wherein said leaf spring assembly includes a hole formed in at least one of said upper and lower sides and at least one of said rigid lower member and said rigid upper member includes a pilot projecting therefrom and at least partially disposed in said hole.

9. The leaf spring suspension assembly of claim 1 including limiting means for for limiting rotational movement between said bearing assembly and said leaf spring assembly, said limiting means being formed on at least one of said rigid lower member and said rigid upper member, a side edge of said leaf spring assembly being interactive with said limiting means.

10. The leaf spring suspension assembly of claim 1 wherein said upper insulator cup and said lower bracket cap define an entrance opening and an exit opening in said bearing assembly and wherein said leaf spring assembly extends through said entrance opening and said exit opening.

11. The leaf spring suspension assembly of claim 1 including means for selectively adjusting and securing a relative position between said leaf spring assembly and said bearing assembly.

12. The leaf spring suspension assembly of claim 11 wherein said means for selectively adjusting and securing comprises a engagement surface formed on said rigid upper member interactive with a pilot including a pilot engagement surface formed thereon, each of said surfaces including serrations, the position of said pilot being adjustable relative to said rigid upper member.

13. The leaf spring suspension assembly of claim 1 wherein said upper recess includes a planar portion.

14. The leaf spring suspension assembly of claim 1 wherein each of said upper and lower sides of said leaf spring assembly includes a hole formed therein, and said rigid lower and said rigid upper members each include a pilot projecting therefrom, and wherein each said pilot is at least partially disposed in each said hole.

15. An elastomer beating assembly adapted for use with a leaf spring assembly, said bearing assembly comprising:

a) an upper insulator cup having an upper planar recess;

b) a lower bracket cap having a lower spherical recess;

c) an upper bonded bearing received in said upper recess, said upper bonded bearing including a rigid lower member having a first pilot and a spherical surface and an upper elastomer element bonded to said spherical surface, said upper elastomer element including a plurality of spherical elastomer layers, said first pilot adapted to be received adjacent to the leaf spring assembly; and d) a lower bonded bearing received in said lower recess, said lower bonded bearing including a rigid upper member having a second pilot and a spherical surface and a lower elastomer element bonded to said spherical surface, said lower elastomer element including a plurality of spherical layers, said second pilot adapted to be received adjacent to die leaf spring assembly;

e) means for selectively adjusting and securing a relative position of the bearing assembly and the leaf spring assembly, said adjusting and securing means being accessible when the bearing is fully assembled.

16. The bearing assembly of claim 15 wherein the first rigid inner member includes a slot; and wherein the means for selectively adjusting and securing a relative position of the leaf spring assembly and the bearing assembly includes a pilot adapted to be received by the leaf spring assembly and seated in the slot, said slot being larger than said pilot in at least one prescribed direction to accommodate movement of the pilot in the slot along the prescribed direction; means for repositioning the pilot relative to the bearing assembly, and means for securing the pilot in a selected position relative to the bearing assembly.

17. An elastomer bearing assembly for use with a leaf spring assembly, said bearing assembly comprising:

a) an insulator cup having an first recess;

b) a bracket cap having a second recess;

c) a first bonded bearing received in said first recess, said first bonded bearing including a first rigid inner member and a first elastomer element bonded to said first rigid inner member; and d) a second bonded bearing received in said second recess, said second bonded bearing including a second rigid inner member and a second elastomer element bonded to said second rigid inner member, said first and second rigid inner members adapted to receive the leaf spring assembly therebetween wherein at least one of said first and second elastomer elements comprises a spherical elastomer element;

e) means for selectively adjusting and securing a relative position of the leaf spring assembly and the bearing assembly, said adjusting and securing means being accessible when the bearing is fully assembled.

18. The bearing assembly of claim 17 wherein said second rigid inner member includes an inwardly facing engagement surface, and means for selectively adjusting and securing a relative position of the leaf spring assembly and the bearing assembly includes:

a pilot adapted to be received by the leaf spring assembly, said pilot including a pilot engagement surface facing said inwardly facing engagement surface; and a bolt member extending through and threadedly engaging said pilot such that said pilot engagement surface may be selectively secured in and released from engagement with said inwardly facing engagement surface;

said pilot engagement surface and said inwardly facing engagement surface being relatively configured to limit movement between said pilot and said second rigid inner member along a prescribed direction when said pilot engagement surface and said inwardly facing engagement surface are engaged.

19. The bearing assembly of claim 18 wherein said inwardly facing engagement surface and said pilot engagement surface include serrations.

20. A bonded bearing for use in a leaf spring suspension assembly including a bearing assembly and a leaf spring having a hole formed therein, said bonded bearing comprising:

a) a rigid inner member having an outer surface;

b) an elastomer element bonded to said outer surface of said rigid inner member; and c) means for selectively adjusting and securing a relative position between the leaf spring and the bonded bearing, said adjustment means including a pilot adjoining said rigid inner member and said leaf spring, said pilot adapted to be received in the hole of the leaf spring, means for repositioning the pilot relative to said rigid inner member, and means for securing the pilot in a selected position relative to said rigid inner member, said selective adjusting and securing means being accessible when the bearing is fully assembled.

21. The bonded bearing of claim 20 wherein:

said rigid inner member includes a slot and an inwardly facing engagement surface that defines a portion of the slot, said slot being larger than said pilot in at least one prescribed direction to accommodate movement of the pilot in the slot along the prescribed direction;

said pilot includes a pilot engagement surface facing said inwardly facing engagement surface, and said adjustment means includes a bolt member extending through and threadedly engaging said pilot such that said pilot engagement surface may be selectively secured in and released from engagement with said inwardly facing engagement surface, said pilot engagement surface and said inwardly facing engagement surface being relatively configured to limit movement between said pilot and said rigid inner member along the prescribed direction when said pilot engagement surface and said inwardly facing engagement surface are engaged.

22. The bonded bearing of claim 21 wherein said second rigid inner member engagement surface and said pilot engagement surface include serrations.

23. The bonded bearing of claim 20 wherein said elastomer element comprises at least two elastomer layers and a shim interposed between said elastomer layers.

24. The bonded bearing of claim 20 wherein said elastomer element is a spherical elastomer element.

25. The bonded bearing of claim 20 including means for restraining rotation formed in said rigid inner member and adapted to receive a side edge of the leaf spring for limiting rotational movement between said rigid inner member and the leaf spring.

26. The bonded bearing of claim 20 including a core hole formed in said elastomer element to allow said elastomer element to bulge when compressed.

* * * * *